M. W. PRISELER & R. W. RUSTERHOLZ
HEAT INSULATED BUCKET.
APPLICATION FILED SEPT. 18, 1909.
1,041,669.
Patented Oct. 15, 1912.
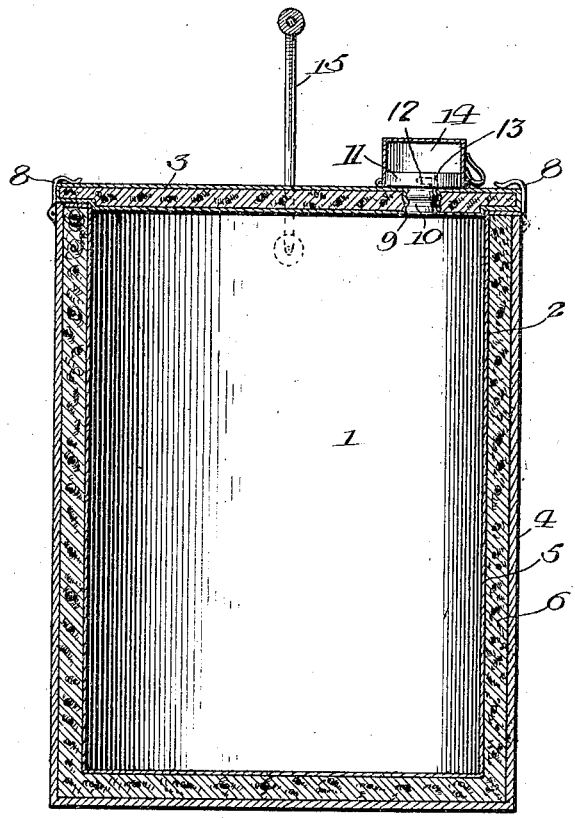
Witnesses
Inventors
Myron W. Priseler
Rudolf W. Rusterholz
by A. Miller Belfield
Atty

UNITED STATES PATENT OFFICE.

MYRON W. PRISELER AND RUDOLF W. RUSTERHOLZ, OF CHICAGO, ILLINOIS.

HEAT-INSULATED BUCKET.

1,041,669.

Specification of Letters Patent.

Patented Oct. 15, 1912.

Application filed September 18, 1909. Serial No. 518,386.

*To all whom it may concern:*

Be it known that we, MYRON W. PRISELER and RUDOLF W. RUSTERHOLZ, citizens of the United States, residing at Chicago, in the county of Cook and State of Illinois, have invented a certain new and useful Improvement in Heat-Insulated Buckets, of which the following is a full, clear, concise, and exact description, reference being had to the accompanying drawings, forming a part of this specification.

Our invention relates to buckets, and has for its object the provision of means for keeping any commodity at a high or low degree of temperature for a protracted period of time. The advantages of being able to do this in an inexpensive manner are numerous and self-evident. It is very frequently necessary, especially in touring, to be able to carry a quantity of liquid, to maintain it at a given temperature or as close thereto as possible, and to be able to extract it from its containing vessel as desired without subjecting the whole contained liquid to the action of the air and tending to change its temperature thereby.

Generally speaking, our invention comprises a large bucket, the one shown in the drawing having been drawn from a model about one foot in diameter, which is constructed of a heat-insulating material, and a cover constructed of similar material, thus excluding the influence of the atmosphere or surroundings to a large extent from affecting the interior of the bucket. A small aperture is provided in the lid through which the contained liquid can be periodically drawn without rendering the whole body of the liquid subject to the changing effect of the atmosphere.

In the accompanying drawing, the figure is a vertical cross section of a pail or bucket illustrating the preferred embodiment of our invention.

Referring to the drawing, it will be seen that to accomplish the above results, we provide a receptacle 1 which is made up of two parts, namely, the body or bucket 2 and the lid or cover 3. The body has an outer casing of wood or other suitable material and an inner lining 5 which is more suitably constructed of metal and forms a receptacle for the purpose of receiving the commodity to be kept at a suitable temperature. Interposed between the outer casing 4 and the inner lining 5 is the heat-insulating material 6 which is more suitably made of cork, but which can be of any other material such as asbestos, hair, felt, or the like. The lid 3 of said receptacle is constructed practically the same as the body 2, only that its outer casing is of metal and forms an inclosure for the heat-insulating material. The lid 3 is constructed so as to entirely close the upper end of the receptacle 5 and thereby assist in keeping the commodity at a desired temperature. We also provide means for clamping the lid 3 down upon the body portion 2 to help maintain a more airtight joint between same. The means for doing this are designated by the numerals 8. Within the lid 3 we also provide an aperture 9 for the purpose of extracting the commodity within the receptacle 5, into which aperture is adapted to be screwed, or otherwise held, the plug 10. The upper end of said plug 10 is provided with a head 11 having a stud or projection 12 secured thereto, which is adapted to be inserted into the bayonet joint 13 in the cup 14, thereby securing the cup to said stud and preventing its loss. The advantage gained by having the comparatively small aperture 9 in the lid 3 is that the entire lid does not have to be removed when it is desired to extract anything from the receptacle 5 and thereby expose the commodity any more than necessary. We also provide a handle 15 for the purpose of transporting said device with greater ease.

The advantages of the device will thus be apparent. The heat-insulating material 6 acts in conjunction with the heat-insulating material provided in the cover and thus entirely incloses liquid or other material desired to be maintained at a high or low temperature, and instead of having to remove the entire cover in order to remove some of the contained liquid, it is merely necessary to withdraw the small plug 10 and allow the liquid to flow out, thus exposing but a very small surface to the action of the air which would tend to change the temperature of the contained liquid.

While we have herein shown and particularly described the preferred embodiment of our invention, we do not limit ourselves to the precise construction and arrangement as herein set forth, but

Having thus described one embodiment thereof, what we claim as new and desire to secure by Letters Patent, is:—

1. A device of the class specified, comprising a lid or cover, which is provided with a small aperture, a plug adapted to fit into and close said aperture, and having a head projecting above the lid, and a cup having a rim of substantially the same size as the head of said plug, whereby said cup may be fitted closely upon and be carried by said head.

2. A device of the class specified having its lid or cover provided with an aperture in combination with a plug fitted into said aperture and having a head 11 and a cup 14 having a bayonet joint for holding said cup detachably in position upon the head 11.

In witness whereof, we hereunto subscribe our names this 13th day of September A. D., 1909.

MYRON W. PRISELER.
RUDOLF W. RUSTERHOLZ.

Witnesses:
A. MILLER BELFIELD.
MAX W. ZABEL.